May 14, 1957  C. W. LINCOLN ET AL  2,792,463
SAFETY SWITCH
Filed Aug. 5, 1952  2 Sheets-Sheet 1
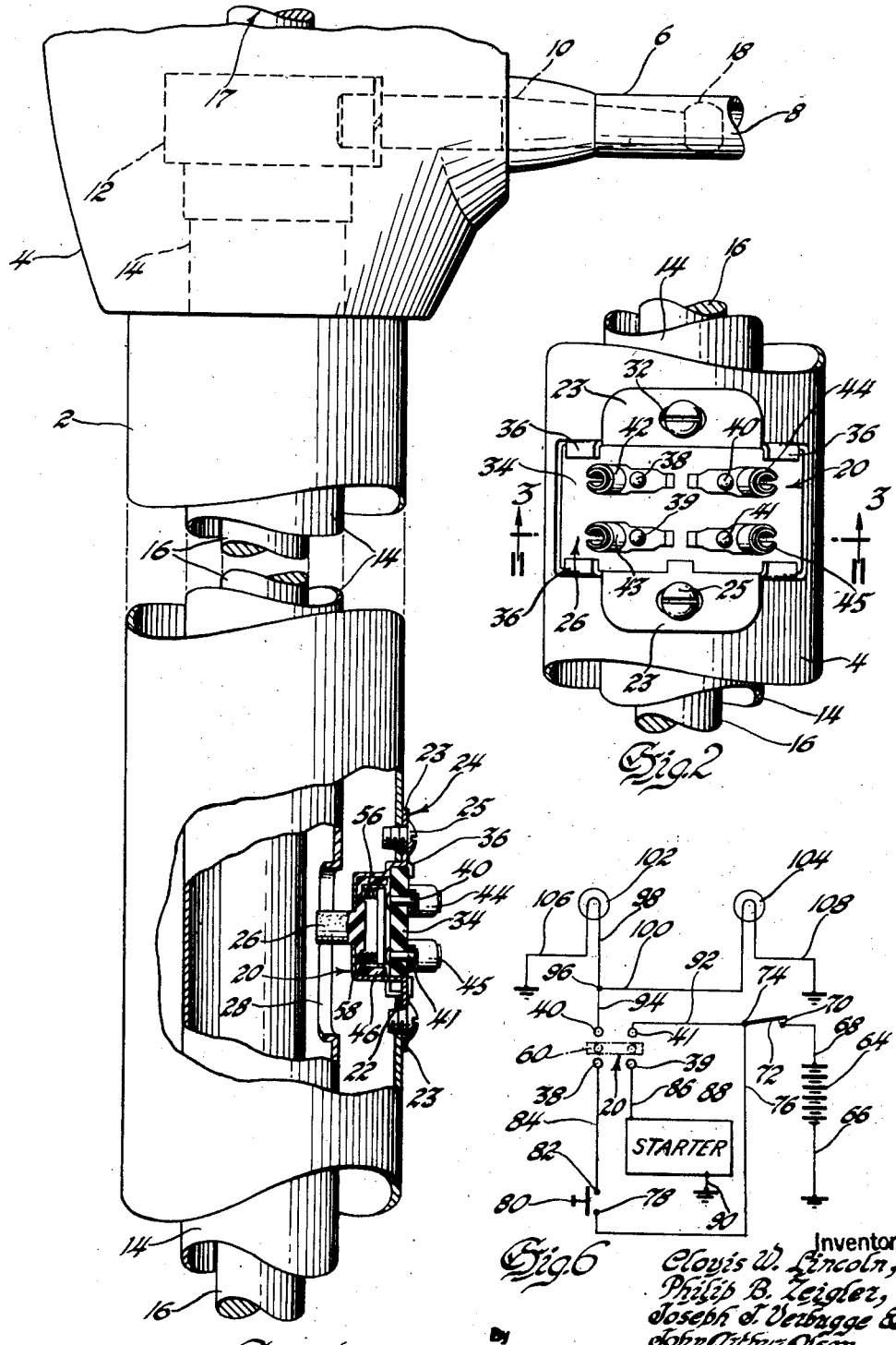
Inventors
Clovis W. Lincoln,
Philip B. Zeigler,
Joseph J. Verbagge &
John Arthur Olson
by
Willito, Helwig & Baillio
Attorneys May 14, 1957 C. W. LINCOLN ET AL 2,792,463
SAFETY SWITCH Filed Aug. 5, 1952 2 Sheets-Sheet 2

Inventors
Clovis W. Lincoln,
Philip B. Zeigler,
Joseph J. Verbugge &
John Arthur Olson Willito, Helwig & Baillio
Attorneys

2,792,463
SAFETY SWITCH

Clovis W. Lincoln, Philip B. Zeigler, Joseph J. Verbrugge, and John Arthur Olson, Saginaw, Mich., assignors to General Motors Corporation, Detroit, Mich., a corporation of Delaware Application August 5, 1952, Serial No. 302,696

2 Claims. (Cl. 200—61.54)

The present invention relates to safety switches and to the operating mechanisms therefor. More particularly the invention relates to dual-position electrical switches adapted for synchronous movement with the transmission control means mounted on the steering column of a vehicle.

In the past, vehicles have been provided with back-up lights which are energized upon movement of the transmission control lever to its reverse position and with starter circuit closers which are actuated upon movement of the control lever to neutral position. Generally, such installations have required separate switches suitably mounted for actuation by the shift lever. Because of additional expense and the time required for installation and adjustment, such equipment has been infrequently used.

Since the advent of automatic transmissions, there has been a great increase in the use of transmission control levers adapted to swing arcuately in one plane, and it is to this type of transmission control the present invention is particularly applicable.

One object of the present invention is to provide a unitary back-up light switch and starter safety switch operable by rotary movement of a steering column transmission control mechanism.

Another object is to provide a unitary back-up light switch and starter safety switch adapted for synchronous movement with a transmission control, wherein the circuit closing positions are coincidental with certain transmission control positions.

Still another object is to provide a combination back-up light and starter safety switch mechanism which is protected from accidental misalignment and also from moisture and foreign matter.

A further object is to provide a combination back-up light switch and starter safety switch mechanism which is easy to install and adjust and is particularly suitable for factory installation on vehicles.

A still further object is to provide a combination back-up light and starter safety switch mechanism which is simple in construction, economical in manufacture and highly efficient in operation.

These and other objects and advantages of the invention will become more fully apparent as reference is had to the accompanying drawings in which:

Fig. 1 is an elevational view, partly in section, of a portion of a steering column and the concentric transmission control, certain parts being broken away to more clearly show the structure and position of the back-up light and starter safety switch and the mounting means therefor.

Fig. 2 is a fragmentary side elevational view of the steering column showing the external mounting means for the unitary back-up light and starter safety switch.

Fig. 6 is a schematic wiring diagram of the combination back-up light and starter safety switch circuits.

Figure 3:
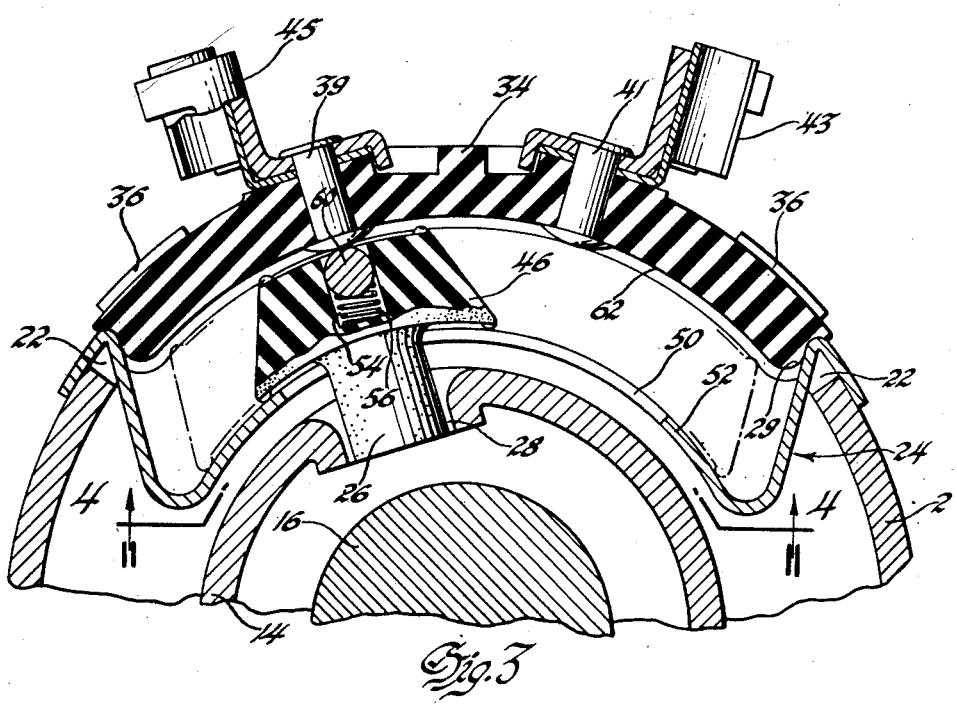
Fig. 3 is an enlarged cross sectional view taken along line 3—3 of Fig. 2.
Figure 4:
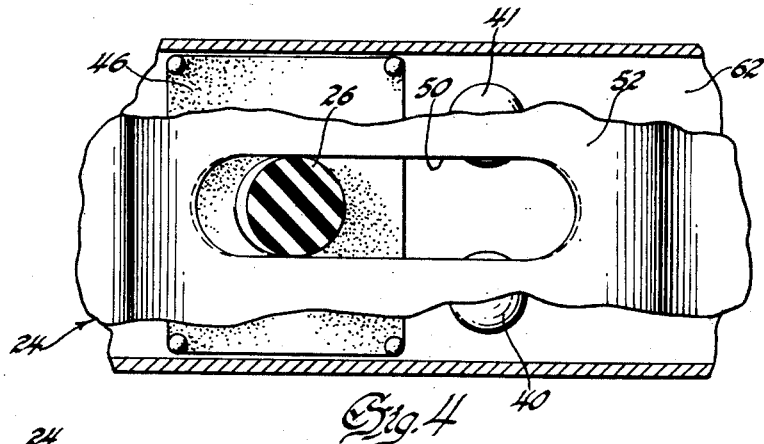
Fig. 4 is an interior view taken substantially along the line 4—4 of Fig. 3.
Figure 5:
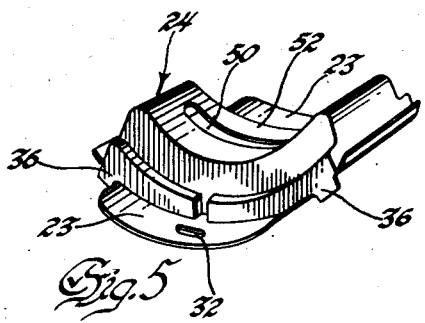
Fig. 5 is a perspective view of the unitary switch housing.

Referring now to the drawings, and more particularly to Fig. 1 the numeral 2 indicates a steering column, the upper end being surrounded by and having secured thereto an enlarged rotatable collar 4 for supporting a transmission control lever 6. Lever 6 is of tubular construction, as shown at 8, and is pivotally supported in the collar 4 in such a manner as to permit slight up and down swinging movement. A relatively short arm 10, shown in dotted lines, extends into the hollow interior of lever 6 and is rigidly attached at one end thereof to the enlarged upper end 12 of transmission control tube 14, surrounding the vehicle steering shaft 16. The other end of arm 10 has an enlarged ball head 18 which fits snugly within lever 6. It will be seen that the swinging movement of control lever 6 in a plane transverse to the steering column is transmitted through the arm 10 to the control tube 14, while the up and down pivotal movement of said control lever will act on the ball end 18 of the arm 10, converting the pivotal movement of the control lever 6 to up and down axial movement of the said control tube. To prevent accidental movement of the control lever 6 into its position of adjustment, it is customary to provide a stop or detent, not shown, for engaging the lower portion of the control tube 14. This stop or detent is so arranged as to require the slight upward movement, hereinbefore mentioned, before continuing the swinging movement of the control lever 6 in the transverse plane into its reverse position of adjustment.

Mounted in an opening 22 provided in steering column 2 a suitable distance below the enlarged rotatable collar 4, is an electrical switch 20. The upper and lower flanges or ears 23 of casing 24 of switch 20 are secured to the steering column 2 by machine screws 25. The operating arm 26 of the switch 20 extends into a longitudinal slot 28 provided in the control tube 14 and is adapted for arcuate movement therewith in response to rotary movement of the said control tube.

Switch 20 comprises the rectangular casing 24 which is of arcuate longitudinal cross section and is open at its outer side as shown at 29 to receive the switch parts, as will presently appear. The outwardly bent ears or flanges 23 have elongated apertures 32 provided therein for receiving the machine screws 25. A curved rectangular terminal plate 34, constructed of insulating material, is mounted in the curved rectangular opening 29 of the casing 24 and is secured therein by bent down tabs 36 integral with casing 24. Attached to the terminal plate 34 are two pairs of spaced apart contacts 38 and 39 and 40 and 41. Contacts 38 and 39 are in substantially vertical alignment and are adapted for connection with the lead wires of the back-up light by contact terminals 42 and 43. Contacts 40 and 41 are also in substantially vertical alignment and are adapted for connection with the starter circuit lead wires by contact terminals 44 and 45. Mounted within the casing 24 for slidable arcuate movement is a bridging member 46 also constructed of insulating material and having the switch operating arm 26 integral therewith. Arm 26 extends through an elongated slot 50 in the arcuate inner surface 52 of the casing 24 and thence as previously described into the longitudinal slot 28 formed in the control tube 14. Bridging member 46, as shown particularly in Figs. 1 and 3, is provided with an elongated substantially vertically disposed recess 54 having a pair of spaced coil springs 56 and 58 mounted near the opposite ends thereof. A roller bridge contact 60 extends across the recess 54 and is seated on the outer ends of the springs 56 and 58. As the bridging member 46 traverses the arcuate path within the casing 24, the spring urged roller contact bridge 60 maintains yielding rolling contact with the inner curved surface 62 of the terminal plate 34.

It will be apparent that as the bridging member 46 is moved within the casing 24 into alignment with contacts 38 and 39, the roller bridge contact 60 will complete the circuit to the back-up light. Conversely, when bridging member 46 is moved toward the other end of the casing 24 to a position in alignment with contacts 40 and 41, the roller bridge contact 60 will engage the latter to complete the circuit to the starter switch. In transmission controls of this type the "Neutral" and "Reverse" position of the control lever 6 are normally at the opposite ends of the range of movement of said lever. The correlation of switch energizing positions with corresponding control lever position is readily accomplished since both the switch contact 46 and the control lever 6 turn about a common axis. Therefore, the number of degrees between contacts 38 and 39 and contacts 40 and 41 will be equivalent to the number of degrees traversed by the control lever tip between its "Neutral" and "Reverse" positions of adjustment irrespective of the difference in linear distance therebetween.

To correct for slight inaccuracies in correlation of energizing positions of the switch 20 with the corresponding "Neutral" and "Reverse" positions of the control lever 6, the switch 20 is adapted for slight radial adjustment within the limits of the elongated slots 32 through which the attaching screws 25 pass.

In Fig. 6 there is illustrated a schematic wiring diagram of the electric circuits including the switch 20 and the apparatus controlled thereby and associated therewith. In the system shown, a storage battery 64 has one terminal connected to ground by conductor 66 and the other terminal connected by conductor 68 to one terminal 70 of an ignition switch 72. The other terminal 74 of ignition switch 72 is connected to the contact 78 of push button switch 80 by conductor 76. The other contact 82 of switch 80 is connected to contact 38 of switch 20 by conductor 84. Contact 39 of switch 20 is connected by a conductor 86 to one terminal of the vehicle engine starter 88. The other terminal of said starter is connected to ground by a conductor 90. Terminal 74 of ignition switch 72 is also connected to terminal 41 of the steering column switch 20 by a conductor 92. Contact 40 is connected by a conductor 94 to junction terminal 96 which in turn is connected by conductors 98 and 100, respectively, to one side of back-up lights 102 and 104. The other sides of back-up lights 102 and 104 are respectively connected to ground by conductors 106 and 108.

In order to energize either the back-up lights 102 and 104 or the engine starter 88, the ignition switch 72 must first be closed. To energize the back-up lights 102 and 104, roller bridge contact 60 is moved into engagement with contacts 40 and 41. To energize engine starter 88, roller bridge contact 60 is moved into engagement with contacts 38 and 39 and push button switch 80 is then manually depressed by the operator.

In order to correlate the various elements hereinbefore specifically described, a brief résumé of the operation of the device as a whole will now be given.

The operator first closes ignition switch 72 preparatory to starting the vehicle engine. Control lever 6 and attached control tube 14 are now moved counterclockwise to "Neutral" position. As the control tube 14 rotates, the elongated slot 28 disposed therein actuates the operating arm 26 of bridging member 46 in the same direction. As the control lever 6 reaches "Neutral," the roller bridge contact 60 bridges contacts 40 and 41. With the control lever 6 in the neutral position the engine starter 88 is energized in the usual manner by depressing the push button switch 80. Conversely, when the control 6 is in any other position of adjustment, roller bridge contact 60 will be out of engagement with contacts 40 and 41, interrupting the circuit to starter 88 and thereby preventing accidental operation thereof when the transmission is in any of its drive positions.

After the vehicle engine is running, if for any reason the operator chooses to move the vehicle in the reverse direction, control lever 6 and the attached control tube 14 are rotated clockwise toward the reverse position by the operator. As the control tube 14 rotates, it actuates the bridging member 46 in the same direction by virtue of its connection with switch arm 26. Just before the control lever 6 reaches reverse position, control tube 14 engages the reverse detent, not shown. The reverse detent is overcome by axial shifting of the tube 14 in response to slight upward swinging movement of control lever 6 and the remaining rotary movement into reverse is then completed. It will be seen that only the rotary movement of tube 14 will be imparted to switch operating arm 26 since the elongated slot 28 in said tube allows axial movement of the tube without imparting similar movement to the operating arm 26 of the switch. With the control lever 6 in its reverse position of adjustment, roller contact bridge 60 bridges contacts 38 and 39 to complete the circuit between the battery 64 and back-up lights 102 and 104 to provide a visual indication that the vehicle will proceed in reverse as well as to illuminate the roadway during such movement of the vehicle. Subsequent movement of the control lever 6 to any other position of adjustment moves the bridging member 46 out of alignment with contacts 38 and 39 thereby disconnecting the back-up light circuit.

While the embodiment of the present invention as hereinabove disclosed constitutes the preferred form, it is to be understood that other forms might be adopted, all coming within the scope of the claims which follow.

We claim:

1. In combination, a steering column, a rotatably movable and axially slidable transmission control member mounted in said steering column, a multi-position switch mounted on said steering column, said switch having an arcuately slidable operating member, and interengaging means on said control member and said switch operating member whereby said operating member moves substantially synchronously with the rotary movement of said control member and idles during axial movement of said control member, said switch means comprises a curved casing member, a curved insulated terminal plate attached to said casing member, a plurality of fixed contacts disposed in circumferentially spaced relation on said terminal plate, and a bridging contact member adapted for slidable movement in a curved path within said casing member, said bridging member including a spring urged contact roller.

2. In combination, a steering column having an opening therein, a rotatably and axially movable transmission control member disposed within said column and having an axially elongated slot provided therein, a multi-position electrical switch mounted on said steering column and extending through said opening, a slidable contact bridging member associated with said switch, and operating means integral with said bridging member and extending into said slot whereby upon rotary movement of said control member, substantially simultaneous movement is imparted to said bridging member.

References Cited in the file of this patent

UNITED STATES PATENTS

| | | |
|---|---|---|
| 1,743,949 | Wortham | Jan. 14, 1930 |
| 1,853,513 | Douglas | Apr. 12, 1932 |
| 1,919,208 | Douglas | July 25, 1933 |
| 1,919,209 | Douglas | July 25, 1933 |
| 2,103,792 | Peterson et al. | Dec. 28, 1937 |
| 2,201,881 | Bryant et al. | May 21, 1940 |
| 2,360,496 | Hill | Oct. 17, 1944 |
| 2,454,702 | Jefferson | Nov. 23, 1948 |
| 2,489,617 | Byram | Nov. 29, 1949 |
| 2,531,377 | Lawson et al. | Nov. 21, 1950 |
| 2,647,178 | Handy | July 28, 1953 |